H. S. BERGEN.
AUTOMATIC SCALE WITH PRICE AND WEIGHT PRINTING ATTACHMENT.
APPLICATION FILED OCT. 14, 1912.
1,347,572.
Patented July 27, 1920.
4 SHEETS—SHEET 3.
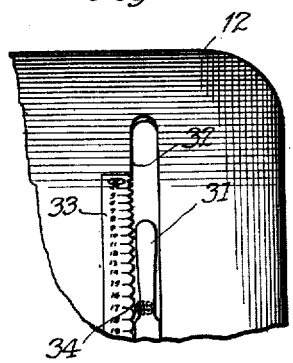
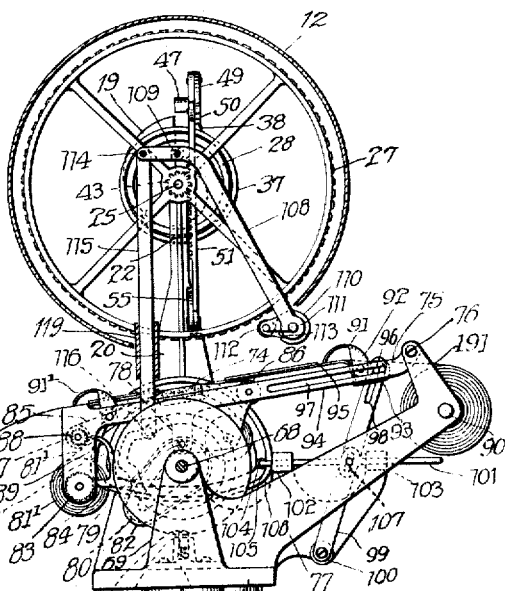
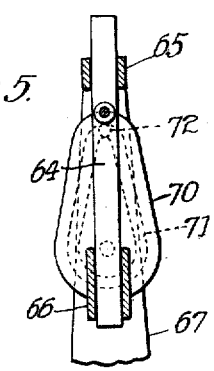
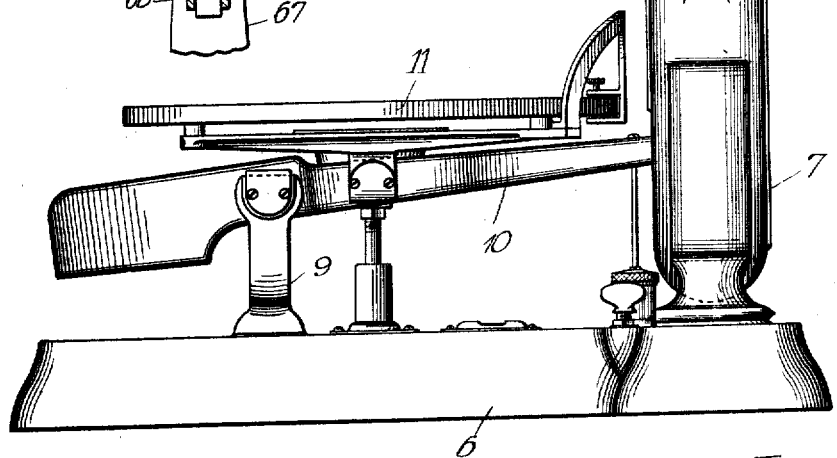

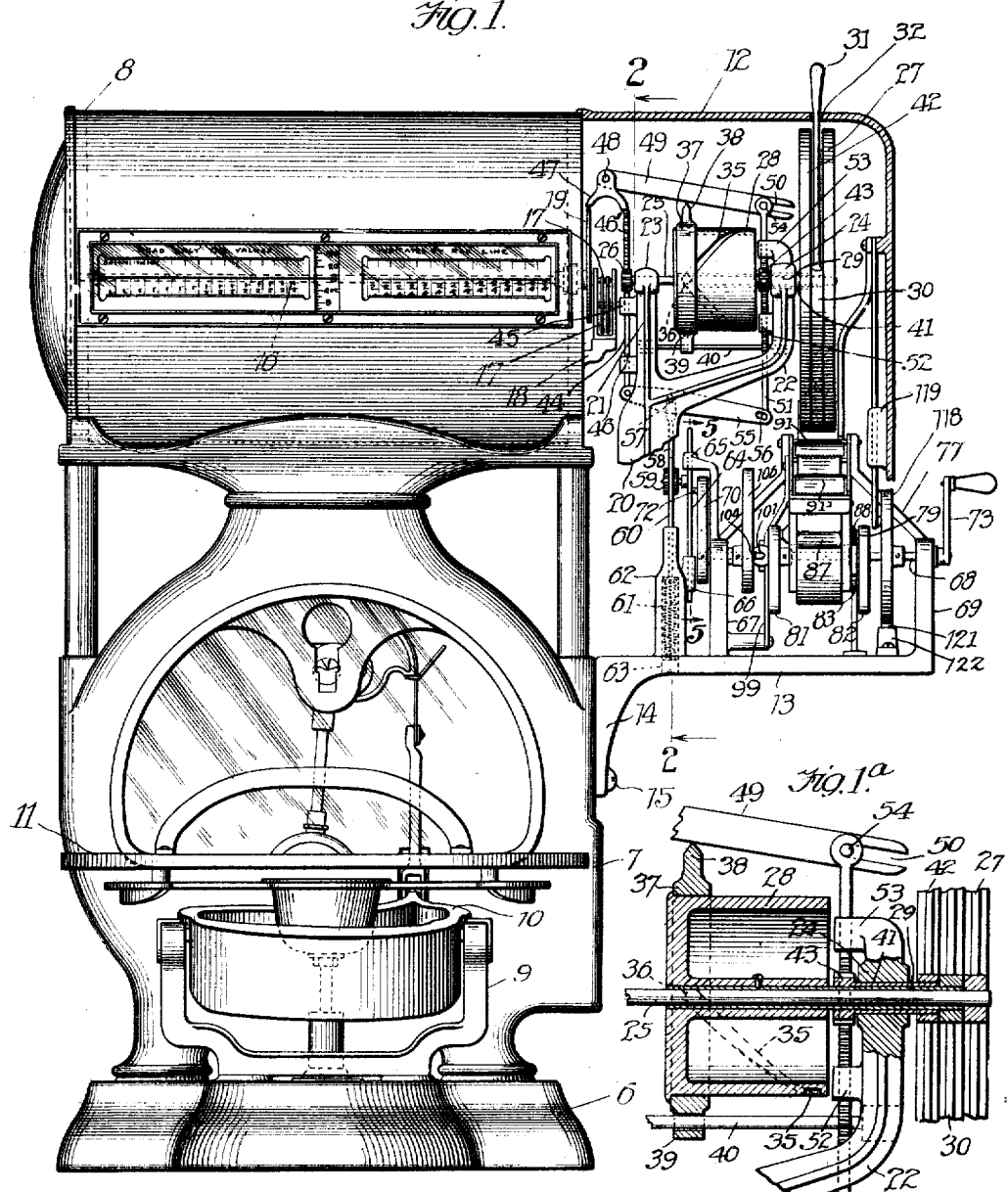

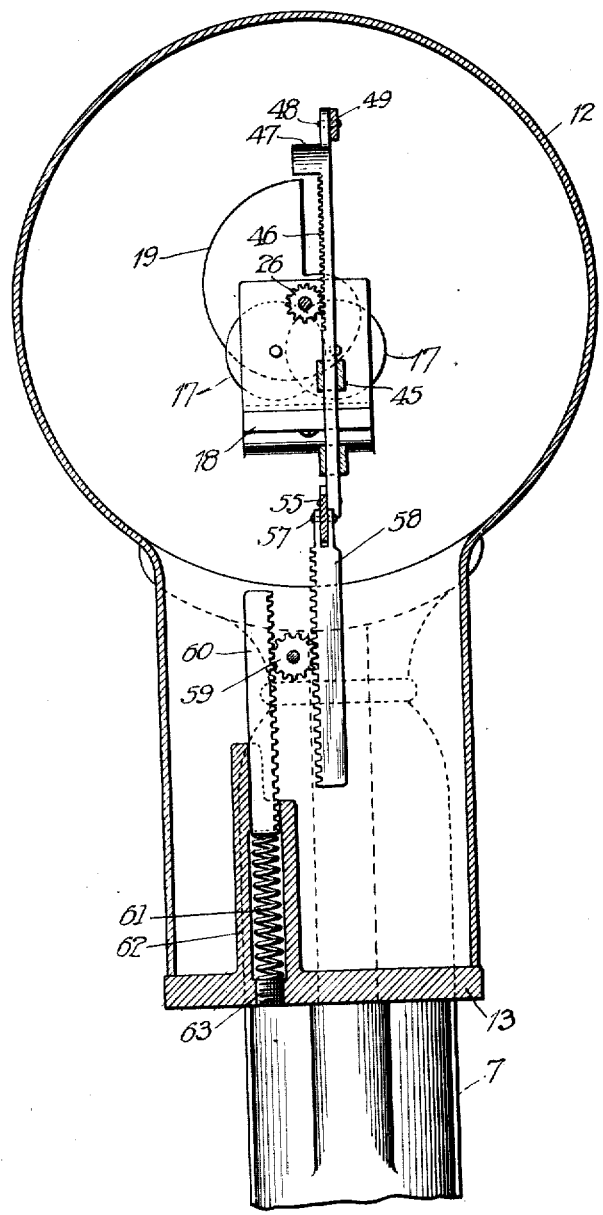

H. S. BERGEN.
AUTOMATIC SCALE WITH PRICE AND WEIGHT PRINTING ATTACHMENT.
APPLICATION FILED OCT. 14, 1912.
1,347,572.
Patented July 27, 1920.
4 SHEETS—SHEET 4.
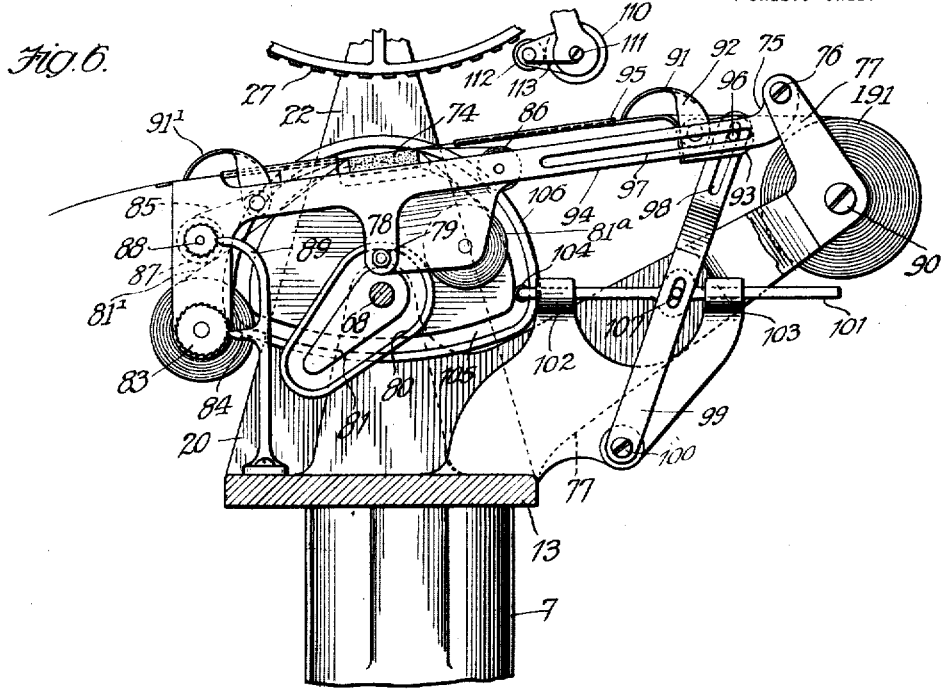
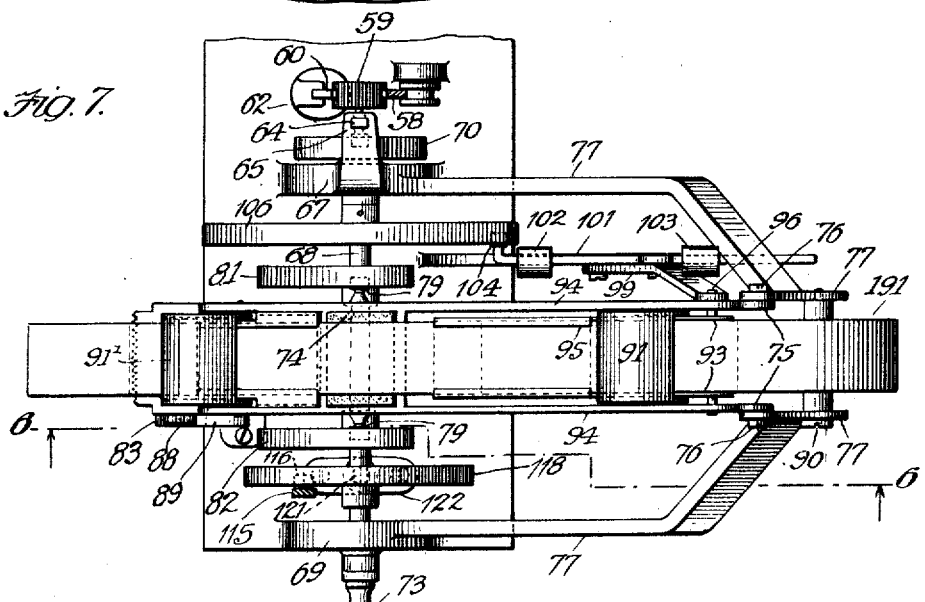

UNITED STATES PATENT OFFICE.

HARRY S. BERGEN, OF TOLEDO, OHIO, ASSIGNOR, BY MESNE ASSIGNMENTS, TO TOLEDO SCALE COMPANY, OF NEWARK, NEW JERSEY, A CORPORATION OF NEW JERSEY.

AUTOMATIC SCALE WITH PRICE AND WEIGHT PRINTING ATTACHMENT.

1,347,572.     Specification of Letters Patent.    Patented July 27, 1920.

Application filed October 14, 1912. Serial No. 725,728.

*To all whom it may concern:*

Be it known that I, HARRY S. BERGEN, a citizen of the United States, residing at Toledo, in the county of Lucas and State of Ohio, have invented certain new and useful Improvements in Automatic Scales with Price and Weight Printing Attachments, of which the following is a specification.

The purpose of the invention is to provide a device of this character in which, by a purely mechanical operation or series of operations upon the part of the salesman manipulating the machine, and without any reckoning or computation by him, a check or ticket may be prepared showing not only the weight of the commodity purchased but the total price or value thereof at any particular price per unit of weight. My improvement, as will appear from a perusal of the following detailed description in connection with the drawings, is applicable (with certain modifications which will present themselves to any mechanic skilled in the art) to a great variety of automatic scales and in fact wherever the indication of the scale depends on the extent of movement of a movable part; but in the present drawings and in the detailed description I have shown it as applied to a counter scale of a more or less familiar character having a cylindrical computing chart or total value indicator. It will be understood, however, that the disclosure of this specific form of scale and attachment is for the purpose of illustration only, though it is the best form of my invention at present known to me; but my invention is not limited thereto but is defined in the following claims.

In the drawings accompanying and forming a part of this specification, Figure 1 is a front elevation of a scale with a cylinder indicator as referred to above, having my invention applied thereto, the casing for the latter, however, being partly in section to show the interior construction; Fig. 1ª is a fragmentary longitudinal vertical section; Fig. 2 is a vertical cross section on the line 2—2 of Fig. 1, on an enlarged scale; Fig. 3 is an end elevation with casing removed; Fig. 4 is a fragmentary view in top plan; Fig. 5 an enlarged detail in vertical section on the line 5—5 of Fig. 1; Fig. 6 is a transverse vertical section on the line 6—6 of Fig. 7; and Fig. 7 a sectional plan showing the printing mechanism. The same reference character is used to refer to each part wherever it is shown in the accompanying drawings.

The base of the scale is shown at 6, and mounted upon one end thereof is a housing 7 containing the counterbalancing mechanism and supporting a cylindrical casing 8, which contains a cylindrical indicating and computing chart. Upon the base 6 is secured the fulcrum support 9, carrying the pivot blocks upon which rest the knives of the beam 10 carrying the scale pan 11, and connected at its outer end to a pendulum counterbalance within the housing 7, all of which elements are or may be of any known or approved form and do not *per se* constitute my invention. Upon the end of the scale housing and casing is mounted an additional housing 12, the floor or bottom wall 13 of which is formed with a bracket arm 14 by which it is attached to the housing 7 at 15. The purpose of this latter housing is to support and protect the specific mechanism to which my invention more particularly relates. The shaft 16 of the cylindrical indicator is extended into the supplemental casing where it is supported upon a pair of anti-friction disks 17 carried in a bifurcated bracket 18, the disks being in separate but adjacent planes and offset transversely of the shaft which rests in the angle or depression between their peripheries (see Figs. 1 and 2). Upon the shaft 16 and intermediate the indicator casing 8 and the bracket 18 is secured a snail cam 19 for a purpose which will appear.

A standard 20 supported in the housing 12 is bifurcated at its upper ends 21—22 and the latter are formed with bosses 23—24 which are drilled in line with the shaft 16 of the indicator to provide bearings for spindle 25. Upon the latter, at its end adjacent the indicating cylinder is mounted a gear wheel 26 and at its outer end a printing disk 27 upon a periphery of which latter is arranged a series of numeral type corresponding to the weight indications upon the indicator chart of the scale but angularly displaced therefrom for coöperation with a printing mechanism, as will appear below. Upon the shaft 25 intermediate the arms 23—24 of the standard is loosely sleeved a drum 28 (see Fig. 1ª), the tubular bearing 29 of which extends through the boss 24 and is rigidly connected to a segment 30 upon the periphery of which is formed a series of numeral type corresponding to prices per unit of weight of the commodity to be dealt with. Integral with the segment is formed a handle 31 which extends through a slot 32 in the housing 12 to the outside thereof, a series of numerals 33 corresponding to the price numerals on the segment being stamped or otherwise formed in or attached to the casing parallel with the slot. Preferably also the handle is formed with a pointer spring 34 for coöperation with said series of numerals and their alined notches 33' in a manner to be hereinafter pointed out. The drum 28 which is sleeved to and turns with the handle and segment as before described is formed with a spiral groove or grooves 35 with which coöperate a pin or pins 36 upon the interior of the annulus 37 loosely surrounding said drum. Said annulus is provided at its upper part with a knife-edged stop or anvil 38 and at its lower part with a perforated lug 39 which slides and is guided upon a guide-rod 40 secured at its ends in the bifurcations of the standard 20. Obviously, by turning the handle 31 and consequently the drum 28 the annulus 37 will be caused to slide longitudinally of the drum and the spring pointer will hold the parts in adjusted position. Around the sleeve 29 carrying the drum segment and handle is a second or exterior sleeve 41 which likewise extends through the boss 24 and the bearing therein and carries at one end a total value disk 42 bearing a series of type numerals indicating total values of different weights at the prices per unit of weight indicated on the segment. At the other side of the boss 24 the exterior sleeve carries a pinion 43. A reciprocating rod 44 is guided in lugs 45—46 formed upon arm 21 of the standard, and at its upper end is formed into a rack 46' which engages the pinion 26 heretofore mentioned as mounted upon the shaft 25 with the weight indicating disk, and above the rack 46 said rod is formed into or connected to a laterally projecting member 47, which, when lowered, engages the snail cam 19 upon the shaft of the indicator chart. Upon the member 47 at 48 is pivoted or fulcrumed a lever 49 which engages the stop before mentioned upon the annulus 37 and extends beyond the same being slotted at its remote end as at 50. A rack rod 51 is guided in lugs 52—53 upon the standard arm 22 and provided at its upper end with a pintle 54 which engages the slot in the lever 49, the rack intermediate the lugs 52 and 53 engaging the pinion 43 which, as before stated, is mounted upon the sleeve with and turns the total valuation disk 42. The two rack rods 44 and 51 are connected at their lower ends by an actuator bar 55, the connection to the rod 51 being made by a pin and slot construction 56, and intermediate its ends said bar is pivoted as at 57 to a rack rod 58 for a purpose which will presently appear. Means is provided for exerting a downward pull upon the actuator bar 55, the effect of which upon the parts just described is as follows:

The racks 46, 51 connected to the opposite ends of the bar are drawn downward, but the movement of the rack 46 is limited by the stop 47 coming in contact with the snail cam upon the indicating cylinder. Since the position of the latter is determined by the amount of load upon the platter the ultimate position of the pivotal point 48 of the lever 49 is determined by the same factor. Previously to the downward pull upon the actuator bar, however, the annulus 37 is adjusted along the lever 49 by turning the handle 31 to the price per unit of weight of the commodity being weighed, indicated upon the scale or arc 33. The lever 49 is drawn downward by the pull upon the bar 55 until the rack 46' to which it is pivoted is stopped by the snail cam, as above stated, and the lever 49 comes in contact with the knife edge 38 upon the annulus. The extent of movement of the slotted end of the lever 49 is therefore a function of or is controlled by the effect of the load upon the snail cam and the price per unit of weight to which the handle 31 is set. As heretofore stated the rack 51 which coöperates with the pinion 43 to determine the position of the total valuation printing wheel 42 is connected to and operated by this end of the lever and, therefore, its extent of movement is also dependent upon the two factors above given.

The means for exerting the downward pull upon the bar 55 and effecting the printing operation will now be described. A rack 58 is pivoted to bar 55 intermediate its ends and depends into contact with an idle pinion 59 which is engaged upon its opposite edge by a rack 60, see Figs. 1 and 2. The latter rack is normally supported in its uppermost position by a spring 61 contained in a housing 62 and abutting at its lower end against a blind screw 63. The pinion 59 is mounted for bodily movement in a vertical direction between the two racks and in the operation of computing the total valuation of the commodity upon the scale and printing the same is drawn downward a definite distance at each operation, as will appear. The rack 60 being held stationary by its spring, the movement of the pinion is of course doubled in the movement of the rack 58 until the downward motion of the latter is terminated by stop 47 coming in contact with the snail cam and the lever 49 with the knife edge of stop 38. When this occurs further movement of the rack 58 is prevented, and as this movement is variable depending upon the two factors above mentioned, it is necessary that the further movement of the pinion 59 be provided for in some other way. This is accomplished by means of the spring-pressed rack 60 which yields and retreats under the pressure of the pinion and permits the latter to complete its descent which is thus accomplished without further movement of the rack bar 58. Pinion 59 is carried and guided in its vertical movement by a slide bar 64 which is guided at its upper and lower ends in bearings 65, 66 formed respectively on standard 67 arising from the bottom of the housing, and on the spring housing 62. A shaft 68 is journaled in standard 67, above referred to, and a second standard 69, and carries at its end adjacent the slide rod a cam 70 which is provided upon its outer face with a cam groove 71 to receive a roller 72 upon the slide rod 64, see Fig. 1 and dotted lines in Fig. 5. The opposite end of the shaft carries a crank handle 73 for rotating the same and the rotary movement of cam 70 gives the reciprocating motion to the slide rod in an obvious manner.

The shaft 68 also gives motion to the printing mechanism which coöperates with the type wheels 27 and 42 and type segment 30, above described. This printing mechanism comprises a platen which is adapted to be swung into contact with the type, an inking roll for the latter, an ink ribbon feed mechanism, and mechanism for feeding a record strip and a check or ticket strip at each operation of the machine. The printing mechanism is best shown in Figs. 3, 6 and 7 in which the platen is seen at 74 mounted on a frame 75 pivoted at 76 to a stationary bracket 77 upon the bracket support 13. The frame is formed at opposite sides with depending lugs 78 (see dotted lines, Fig. 3) which carry rollers 79 upon their outer faces for engagement with cam grooves 80 upon the inner faces of cams 81, 82 upon the shaft 68 above described. From the shape of the cams, as indicated in Figs. 3 and 6, it is evident that the rotation of the same by the handle 73 will swing the platen upward into contact with the type wheels and segment and lower it again when the printing operation has been effected.

Upon the platen frame are mounted a record ribbon supply 81ª and a take-up roll or reel 81ᵇ, the latter being provided with a ratchet wheel 83 which is turned a step by a stationary pawl 84 with every swinging movement of the platen. The record ribbon 81' is of course passed from the supply reel over the platen and to the take-up reel as is customary in devices of this character. An ink ribbon 85, which may be of any well-known or usual character is provided for effecting impressions upon the record ribbon or strip and is wound with a step by step movement from the supply spool 86 to the take-up spool 87, which latter is furnished with a ratchet 88 coöperating with a stationary pawl 89 for giving it rotation. A check strip reel is mounted between the bracket arms 77 at 90, from which the check strip 191 is drawn over the platen and between the same and the type wheels and segment. For feeding the strip a toothed pawl or gripper 91 with downwardly bent ears 92 is pivoted to a sliding block 93 which is slidingly mounted between the side members 94 of the platen frame and also carries a forwardly projecting apron 95 over which runs the check strip and to which the latter is clamped by said gripper. A spring of any suitable character is employed to keep the gripper in contact with the strip and the latter may, if desired, be furnished with transverse rows of perforations or scorings at suitable intervals to be engaged by the grippers, but this is not necessary.

Pins 96 project from opposite sides of the sliding block into slots 97 in the side of the platen frame and through a similar slot 98 formed in the ends of a swinging arm 99 which is pivoted to the stationary frame at 100. The arm 99 is caused to swing or oscillate from the cam shaft 68 by means of a slide rod 101 mounted in bearings 102, 103 in the stationary frame and carrying at its forward end a roller 104 which engages a cam groove 105 in the face of cam 106 on the cam shaft 68. The slide rod 101 engages the arm 99 by means of a pin and slot connection 107 and it is readily seen that the rotation of the cam 106 by the cam shaft will cause the slide rod to operate the gripper through the medium of the pivoted arm 99. Near the front edge of the platen frame is pivoted a holding gripper 91' which prevents the backward movement of the check strip between operations of the feeding gripper.

The inking mechanism for the type consists of an arm 108 pivoted above the center of the type wheels at 109 and carrying at its lower end an inking device comprising an ink supply roller 110 pivoted in the arm at 111, and an ink applying roller 112 engaging roller 110 but mounted on the arm 108 by a spring arm 113. Obviously as the arm 108 is swung forwardly from the position shown in Fig. 3, the inking roller 112 will come into contact with and bear upon the type at a point just above the platen. In order to effect the desired movement of the arm 108 it is pivoted at its shorter end 114 to a link 115, the lower end of which carries an anti-friction roller 116 running in a cam groove 117 formed in a disk 118 on the cam shaft 68. The cam groove is so designed as to cause the ink roller to be swept across the face of the type just before each operation of the platen. As shown in Fig. 1, link 115 is guided in a bearing 119 formed on the inner side of the housing wall.

In order to avoid unintentional movement of the parts, especially during the weighing operation and before the beam comes to rest, the disk 118 is formed on its periphery with a V-shaped notch 120 with which coöperates a spring-pressed plunger 121 contained in a suitable guide housing 122 mounted upon the bracket 13.

The functions and operations of the various parts have been described in connection with their construction, but the operation of the machine as a whole may be stated as follows: Normally the parts are in the position shown in the figures with the cam shaft held against movement by the plunger 120. When a load is placed upon the platform or pan of the scale the weighing mechanism proper is permitted to come to rest before any manipulation of the computing and printing mechanism. The first further operation on the part of the person manipulating the scale is to adjust the handle 31 to the price per unit of weight at which the commodity is to be sold, thereby bringing the corresponding type on the segment over the platen and, by means of the grooved drum 28, adjusting the knife edge stop 38 accordingly along the lever 49. The only further manipulation required is to make a complete rotation of the handle 73. The cams mounted on the cam shaft and turned by the handle are so formed and timed as to operate the computing and printing mechanism in the following manner and order; the cam 70 acting upon the roller 72 upon the slide rod 64 presses down the pinion 59 carried by said rod which as above described draws down upon the rack rod 58 and the bar or lever 55. The pull of the latter is distributed between the racks 46 and 51. The movement of rack 46 is limited by the fulcrum support 47 coming in contact with the snail-cam while the movement of the rack 51 is limited by the contact of the lever 49 with the knife edge 38. As above observed the extent of these movements depends upon the price per unit of weight to which the handle 31 is set and the weight of the commodity, and the rack bar 51 drives the pinion 43 and hence the total value disk 42 to bring the type upon the periphery of the latter representing the correct value of the commodity at the desired price per unit of weight above the platen. The movement of the rack 46 in the meantime revolves the weight indicating disk to a position in which the type corresponding to the weight of the commodity is directly above the platen alongside the type indicating the price per pound and total value. Further rotation of the cam shaft, which in the course of each operation is given one complete continuous revolution by means of the connections heretofore described, causes the inking roll to sweep across the face of the type and retreat to its normal position and the platen over which extends the recording ribbon, ink ribbon and check strip in the order named, to swing upward into contact with the type. On the lowering of the platen as the ratchet wheels 83 and 88 brush past the stationary pawls, they feed the inking ribbon and recording strip forward to bring a new portion thereof over the platen and beneath the type. Before the cam shaft and handle arrive at the normal position the feeding gripper is caused to grip and feed the printed end of the check beyond the stationary gripper 91 where it projects from the machine a sufficient distance to be readily grasped and torn off against the projecting serrated biting edge of the stationary gripper. The cam shaft is returned to its normal position with the plunger engaging the notch in disk 118.

The form of invention illustrated and specifically described above is that preferred by me but as before stated many modifications or additions may be made thereto without departing from the spirit and scope of my invention as set forth in the following claims, in which I have endeavored to distinguish the same from the prior art without, however, limiting it or abandoning any part thereof.

I claim:

1. A computing scale comprising a weighing mechanism and an indicator giving values for different weights at varying prices per unit of weight, a member connected to the weighing mechanism and moved thereby according to the weight of the load on the scale, an element movable independently of said member and controlling the value indicator, and a manually-controlled member normally spaced from said element and adapted to be adjusted according to the price per unit of weight of the commodity constituting the load, said element in its movement directly engaging and being controlled as to position jointly by said members, and means for moving said element.

2. A computing scale comprising a weighing mechanism and an indicator giving values for different weights at varying prices per unit of weight, a member connected to the weighing mechanism and adjusted thereby to different positions according to the weight of the load on the scale, a manually controlled member adapted to be adjusted according to the price per unit of weight of the commodity constituting the load and an element movable independently of the weighing mechanism and transversely to the directions of movement of said members controlling the value indicator and controlled as to its position jointly by said members, and means for moving said element.

3. A computing scale comprising a weighing mechanism and an indicator giving values for different weights at varying prices per unit of weight, a stop member connected to the weighing mechanism and adjusted thereby according to the weight of the load on the scale, a manually controlled stop member adapted to be adjusted according to the price per unit of weight of the commodity constituting the load, a lever movable laterally into contact with said stops, connections from the lever to the commodity indicator for operating the same and means for laterally moving the lever.

4. A computing scale comprising a weighing mechanism and an indicator giving values for different weights at varying prices per unit of weight, a stop member connected to the weighing mechanism and moved thereby according to the weight of the load on the scale, an element movable independently of said member and controlling the value indicator, and a manually-controlled stop member normally spaced from said element and adapted to be adjusted according to the price per unit of weight of the commodity constituting the load, said element in its movement directly engaging and being controlled as to position jointly by said stop members, and means for moving said element.

5. In a computing scale having a total value indicator and a weighing mechanism proper, a movable member the extent of whose departure from normal position controls the total value indication, means for moving said member, an adjustable stop for said member controlled in its position by a movable part of the weighing mechanism proper and a second stop manually controlled in its position according to the price per unit of weight of the commodity constituting the load, and normally spaced from the movable member, the stops jointly engaging and controlling the movable member.

6. In a computing scale, a weighing mechanism proper and a total value indicator, a computing lever controlling the extent of movement of the total value indicator, an adjustable stop therefor controlled by the weighing mechanism proper and a second stop manually controlled in its position according to the price per unit of weight of the commodity constituting the load, said stops engaged by and jointly controlling the extent of movement of said lever.

7. In a computing scale, a weighing mechanism proper, a total value indicator, a computing lever, means for moving the same, a pair of stops for fixing the position of the computing lever, one of which is adjustable along the lever and the other transversely of the lever, one of the stops being controlled by the position of a movable part of the weighing mechanism proper and the other stop manually controlled according to the price per unit of weight of the commodity being weighed, said stops engaged by and jointly controlling the extent of movement of said lever.

8. In a computing scale comprising a weighing mechanism proper and a total value indicating device, a computing lever controlling the latter pivoted at one end to a movable fulcrum, connections from the weighing mechanism proper for controlling the extent of movement of the fulcrum and a stop adjustable according to the price per unit of weight of the commodity being weighed for directly engaging and limiting the pivotal movement of the lever about its fulcrum.

9. In a computing scale comprising a weighing mechanism proper and a total value indicating device, a computing lever controlling the latter pivoted at one end to a movable fulcrum, connections from the weighing mechanism proper for controlling the extent of movement of the fulcrum and a stop adjustable longitudinally of the lever according to the price per unit of weight of the commodity being weighed for directly engaging and limiting the pivotal movement of the lever about its fulcrum.

10. In a computing scale comprising a weighing mechanism proper, a total value indicating means, a computing lever for operating the indicator having a fulcrum adjustable transversely with relation to the length of said lever, means for adjusting said fulcrum, a stop controlled by the position of a movable part of the weighing mechanism proper and determining the adjustment of the fulcrum of the said lever, a stop adjustable along the lever for directly engaging the same and manually controlled means for adjusting said stop according to the price per unit of weight of the commodity being weighed.

11. In a computing scale in combination with the weighing mechanism proper and a total value indicator, a computing lever, a fulcrum support therefor adjustable transversely to the lever, a stop adjustable lengthwise of the lever, a stop for limiting the movement of the fulcrum support, connections from the weighing mechanism proper for controlling one of said stops, manually operated means for adjusting the other stop according to the price per unit of weight, connections from the lever to the total value indicator for operating the latter and means connected to the fulcrum support of the lever and to said lever for adjusting them respectively into contact with said stops.

12. In a computing scale and in combination with the weighing mechanism proper and the total value indicator thereof, a computing lever, a fulcrum adjustable transversely thereof to which said lever is pivoted, means connected to the weighing mechanism proper for controlling the position of said fulcrum, means connected to the free end of the lever and to the total value indicator for operating the latter and a stop normally spaced from the lever and adjustable lengthwise of the lever according to prices per unit of weight of the commodity being weighed.

13. In a computing scale and in combination with the weighing mechanism proper thereof and the total value indicator, a computing lever, a fulcrum support therefor, adjustable transversely of said lever, means connected to the weighing mechanism proper for controlling the position of said fulcrum support, a rack connected to the free end of said lever, a pinion operated by the rack and controlling the total value indicator and a stop normally spaced from the lever and adjustable longitudinally of the lever according to the price per unit of weight of the commodity being weighed.

14. In a computing scale and in combination with the weighing mechanism proper and total value indicator thereof, a computing lever, a support for the fulcrum thereof adjustable transversely of the lever, means connected to the weighing mechanism proper controlling the extent of the adjustment of said fulcrum support, a stop adjustable longitudinally of the lever, a rack connected to the free end of the lever, a pinion engaging the rack and rotary total value indicating means connected to and operated by the pinion.

15. In a computing scale and in combination with the weighing mechanism proper and total value indicator thereof, a computing lever, a support for the fulcrum thereof adjustable transversely of the lever, means connected to the weighing mechanism proper controlling the extent of the adjustment of said fulcrum support, a stop adjustable longitudinally of the lever, a rack connected to the free end of the lever, a pinion engaging the rack and a type wheel operated by the pinion having type corresponding to total values of different weights of commodities at different prices per unit of weight and printing means coöperating with the type.

16. In a computing scale and in combination with the weighing mechanism proper and total value indicator thereof, a computing lever, means controlled by the position of a movable part of the weighing mechanism proper for adjustment of the lever, means connected to the free end of the lever and to the total value indicator for operating the latter, a stop adjustable longitudinally of the lever according to prices per unit of weight of the commodity being weighed, means for guiding the stop, a handle for operating the stop a type sector carrying numerals representing a series of prices per unit of weight operated by the handle, and a printing mechanism coöperating therewith.

17. In a computing scale and in combination with the weighing mechanism proper thereof and with the total value indicating mechanism, a computing lever, the fulcrum of which is adjustable transversely to its length and controlled by the position of a movable part of the weighing machine proper, means connected to the free end of the lever and to the total indicator for operating the latter, a stop adjustable longitudinally of the lever, a handle for operating the stop and a segment carrying type representing price per unit of weight also operated by the handle, and printing means coöperating with said segment.

18. In a computing scale and in combination with the weighing mechanism proper and the total value indicating mechanism, a computing lever, a fulcrum support therefor movable transversely thereof, means connected to and controlled by the weighing mechanism proper for controlling the position of the fulcrum of the computing lever, means connected to the free end of the lever and to the total value indicator for operating the latter, a stop adjustable longitudinally of the lever, a rotary member having a spiral cam surface engaging the stop and means for rotating said member.

19. In a computing scale and in combination with the weighing mechanism proper and the total value indicating mechanism, a computing lever, a fulcrum support therefor movable transversely thereof, means connected to and controlled by the weighing mechanism proper for controlling the position of the fulcrum of the computing lever, means connected to the free end of the lever and to the total value indicator for operating the latter, a stop adjustable longitudinally of the lever, a pin on the stop, a rotary member having a spiral groove for receiving and engaging said pin and means for rotating the rotary member.

20. In a computing scale and in combination with the weighing mechanism proper and the total value indicator, a computing lever, a support for the fulcrum thereof movable laterally with respect to the lever, a stop controlled by the position of a movable member of the weighing mechanism proper and controlling the position of the fulcrum, a total value indicating mechanism connected to and operated by the lever, a rotary member having a handle and chart for angularly adjusting it proportionally to the prices per unit of weight, and an annulus having a stop mounted thereon and surrounding the rotary member, the rotary member being formed with a spiral surface engaging the annulus for adjusting it longitudinally of the lever.

21. In a computing scale and in combination with the weighing mechanism proper and the total value indicator thereof, a laterally movable computing lever, the fulcrum whereof is laterally adjustable but limited in its adjustment by the position of a movable element of the weighing mechanism proper, a rack connected to the free end of the lever, a pinion coöperating with the rack and connected with the total value indicating mechanism to operate the latter, a rotary drum having a groove therein, a stop mounted on an annulus surrounding said drum and having a pin engaging said groove, and means for rotating said drum to adjust the stop.

22. In a computing scale and in combination with the weighing mechanism proper and the total value indicator thereof, a computing lever, a fulcrum support to which the latter is pivoted, a rack bar connected to said support, a pinion operated by the rack, a rotary weight indicator connected to the pinion, an adjustable stop controlled in its position by the weighing mechanism proper and limiting the movement of the fulcrum support, an adjustable stop for limiting the angular movement of the lever, a rack bar connected to the free end of the computing lever, a pinion operated by the rack and connected to and operating the total value indicator, a connecting bar connecting said racks and means for moving said connecting bar transversely with respect to its length.

23. In a computing scale and in combination with the weighing mechanism proper and the total value indicator thereof, a computing lever, a fulcrum support pivoted thereto, a stop controlled by the movement of a movable part of the weighing mechanism proper and limiting the movement of the fulcrum support, a rack connected to said support, a pinion operated by the rack and operating the weight indicator, a rack connected to the free end of the computing lever, a pinion operated by said last named rack and operating a total value indicator, a stop adjustable along the lever, a rotary element having a cam engaging the stop for adjusting the same, a handle for rotating said member according to the price per unit of weight and means connected to the rack bars for operating the same and drawing the fulcrum support into contact with one stop and the lever into contact with the other.

24. In a computing scale and in combination with a weighing mechanism proper and the total value indicating means therefor, of a computing lever, a fulcrum support movable transversely of the lever to which the latter is pivoted, a stop operated by a moving part of the weighing mechanism proper and adapted to limit the movement of the fulcrum support, a stop adapted to limit the movement of the lever about its pivot, means for adjusting said stop according to the price per unit of weight of the commodity being weighed, connections from said lever for operating the total value indicator, means connected to the fulcrum support and to the lever for moving the latter laterally comprising a rack bar connected thereto, a spring-pressed rack bar, a pinion intermediate said rack bars and means for reciprocating the pinion longitudinally of said bars.

25. In a computing scale and in combination with the weighing mechanism proper and the total value indicator thereof, a computing lever, a laterally movable fulcrum to which the lever is pivoted, an adjustable stop, the position of which is controlled by the weighing mechanism proper, adapted to limit the movement of said fulcrum, a rack bar connected to said fulcrum, a pinion in mesh with the rack bar and mounted upon a revoluble shaft, a weighing indicator also mounted upon said shaft, a stop movable longitudinally of the lever, a drum surrounding said shaft but revoluble with relation thereto and having a cam connection with the last-named stop, a sleeve on which the drum is mounted surrounding said shaft and connected to a handle for rotarily adjusting the same according to the price per unit of weight of the commodity being weighed, a second sleeve surrounding the first-said sleeve and having a pinion and a total weight indicating disk mounted thereon, a rack connected to the computing lever and engaging the latter pinion, a bar connecting said racks and means for moving said bar laterally.

26. In a computing scale and in combination with the weighing mechanism proper and the total value indicator thereof, means for operating the total value indicator devices for controlling said means by the position of the weighing means proper and in accordance with the price per unit of weight, means for operating the last-said means comprising a rack connected thereto, a second rack and spring for normally holding the latter in position, a pinion intermediate the racks, a reciprocating carrier comprising a shaft having a handle and a rotary cam thereon, the latter engaging said carriage.

27. In a computing scale and in combination with the weighing mechanism proper thereof, a total value indicator disk, the periphery of which is provided with numeral type corresponding to total values of different weights at varying prices per unit of weight, means for adjusting said disk angularly, the movement of said means being limited by stops, one of which is positioned by the weighing mechanism proper and the other of which is positioned according to the price per unit of weight of the commodity being weighed.

28. In a computing and printing scale having a rotary chart, a cam on the shaft of said chart, a computing lever, a fulcrum upon which the same is pivoted, means for moving the fulcrum laterally with respect to the lever, said cam being so positioned with the lever and its fulcrum as to limit the movement of the latter, a stop movable lengthwise of the lever, means for adjusting said stop according to the price per unit of weight of the commodity being weighed, a rotary disk having thereon numerals indicating total values of different weights at varying prices per unit of weight, and connections from the computing lever to the disk for operating the latter.

29. In a computing and printing scale in combination with the weighing mechanism proper thereof, a computing lever having a laterally movable fulcrum, a stop therefor controlled in its position by a movable element of the weighing mechanism proper, a stop adjustable lengthwise of the computing lever according to the price per unit of weight of the commodity being weighed, means for adjusting said stop comprising a handle having a type segment thereon, the edge of which is formed with type showing various prices per unit of weight, a type disk concentric with said segment having type on its periphery indicating total values of different weights at the prices per unit of weight indicated on the segment, a pinion connected to said disk, a rack connected to the computing lever and engaging said pinion, an actuator bar connected to the movable fulcrum and to said rack, a printing platen arranged to simultaneously engage the peripheries of the price segment and value disk simultaneously, a shaft having means for operating said platen and said actuator bar and a handle for rotating said shaft.

30. In a computing and printing scale in combination with the weighing mechanism proper thereof, a computing lever having a laterally movable fulcrum, a stop therefor controlled in its position by a movable element of the weighing mechanism proper, a stop adjustable lengthwise of the computing lever according to the price per unit of weight of the commodity being weighed, means for adjusting said stop comprising a handle having a type segment thereon, the edge of which is formed with type showing various prices per unit of weight, a type disk concentric with said segment having type on its periphery indicating total values of different weights at the prices per unit of weight indicated on the segment, a pinion connected to said disk, a rack connected to the computing lever and engaging said pinion, an actuator bar connected to the movable fulcrum and to said rack, a printing platen arranged to simultaneously engage the peripheries of the price segment and value disk simultaneously, a shaft having means for operating said platen and said actuator bar, a handle for rotating said shaft, a disk on said shaft having a notch in the periphery thereof and a spring pressed plunger for engaging said notch.

31. In a computing and printing scale and in combination with the weighing mechanism proper thereof, a computing lever, means operated from the weighing mechanism to determine the adjustment of said computing lever, printing mechanism having elements thereof arranged to be set by movement of said computing lever, actuating means for the printing mechanism, and a flexible connection between said actuating means and the computing lever allowing a variable adjusted movement of the said computing lever and a full predetermined cycle of movements of the printing mechanism.

32. In a computing and printing scale and in combination with the weighing mechanism proper thereof, a computing lever, means operated from the weighing mechanism to determine the adjustment of said computing lever, printing mechanism having elements thereof arranged to be set by movement of said computing lever, actuating means for the printing mechanism, and a flexible connection between said actuating means and the computing lever allowing a variable adjusted movement of the said computing lever and a full predetermined cycle of movements of the printing mechanism, said flexible connection including a pinion and a spring-pressed rack meshing therewith.

33. In a computing and printing scale and in combination with the weighing mechanism proper thereof, a computing lever, means operated from the weighing mechanism to determine the adjustment of said computing lever, printing mechanism having elements thereof arranged to be set by movement of said computing lever, actuating means for the printing mechanism and a flexible connection between said actuating means and the computing lever allowing a variable adjusted movement of the said computing lever and a full predetermined cycle of movements of the printing mechanism, said flexible connection including a vertically-movable pinion and a vertically-movable spring-pressed rack meshing therewith.

HARRY S. BERGEN.

Witnesses:
LEWIS C. WETZEL,
CLARENCE W. FESSENDEN.